US009336636B2

(12) United States Patent
Soana

(10) Patent No.: US 9,336,636 B2
(45) Date of Patent: May 10, 2016

(54) APPARATUS AND SYSTEM FOR CONTROLLING ACCESS TO PREMISES

(71) Applicant: DOS & DONTS S.R.L., Rho (Milan) (IT)

(72) Inventor: Piercarlo Soana, Legnano (IT)

(73) Assignee: DOS & DONTS S.R.L., Rho (Milan) (IT)

( * ) Notice: Subject to any disclaimer, the term of this patent is extended or adjusted under 35 U.S.C. 154(b) by 0 days.

(21) Appl. No.: 14/413,913

(22) PCT Filed: May 30, 2013

(86) PCT No.: PCT/IB2013/054460
§ 371 (c)(1),
(2) Date: Jan. 9, 2015

(87) PCT Pub. No.: WO2014/009821
PCT Pub. Date: Jan. 16, 2014

(65) Prior Publication Data

US 2015/0199862 A1 Jul. 16, 2015

(30) Foreign Application Priority Data

Jul. 9, 2012 (IT) .............................. MI2012A1196

(51) Int. Cl.
*G05B 19/00* (2006.01)
*G07C 9/00* (2006.01)

(52) U.S. Cl.
CPC ........ *G07C 9/00166* (2013.01); *G07C 9/00896* (2013.01); *G07C 2209/62* (2013.01)

(58) Field of Classification Search
CPC ........................ G07C 9/00166; G07C 9/00896
USPC .......................................................... 340/5.2
See application file for complete search history.

(56) References Cited

U.S. PATENT DOCUMENTS 8,378,988 B1 * 2/2013 Artino .................... H04N 7/186 235/382
2007/0227204 A1 10/2007 Shoenfeld
2008/0284579 A1 11/2008 Contreras
2014/0006823 A1 * 1/2014 Lamb .................. H02J 13/0086 713/323
2014/0252927 A1 * 9/2014 Denny ................... B65D 83/02 312/209
2015/0356692 A1 * 12/2015 Shelford ................ G06Q 50/01 705/7.13

FOREIGN PATENT DOCUMENTS

WO 00/77330 12/2000

OTHER PUBLICATIONS

International Search Report and Written Opinion dated Oct. 1, 2013 for corresponding patent application No. PCT/IB2013/054460.

* cited by examiner

*Primary Examiner* — Don N Vo
(74) *Attorney, Agent, or Firm* — Wegman, Hessler & Vanderburg

(57) ABSTRACT

The invention describes a control apparatus 100 for controlling access to premises, comprising at least one access door (10) to a premises (1), at least one detection device (12) in said premises (1), a control device (20) configured to determine commands (C11, C12, C2) for the premises (1), wherein the device (20) comprises a user interface (30) configured to receive first primary parameters (P11) for commanding the door and auxiliary parameters (P2) for activating a detection device (12), a processing unit (40) for processing the parameters received so as to determine first commands (C11) for the door (10) and third commands (C2) for the detection device (12), an operating module (45) for transmitting the first and third commands (C11, C2) to at least one door (10) and to at least one detection device (12), respectively.

22 Claims, 2 Drawing Sheets

APPARATUS AND SYSTEM FOR CONTROLLING ACCESS TO PREMISES

FIELD OF APPLICATION

The present invention refers to a control apparatus for controlling access to premises.

Specifically, the present invention refers to a control apparatus for controlling access to doors of industrial buildings, hospitals, research centres, chemical and pharmaceutical laboratories, data archives centres, public offices, offices for archives of sensitive data and the like.

Still more specifically, the present invention refers to a control apparatus for controlling access to climatic chambers and the description provided herein below refers to this field of application with the sole aim of simplifying the description.

BACKGROUND OF THE INVENTION

As is known, some types of industrial production and processes require working in controlled environments in which the air must be suitably treated with absolute filters so as to ensure the absence of particulate and impurities according to predetermined standards, which vary according to type of classified environment.

Given that staff members and materials must have access to the environments, suitable access filters must be established so as to prevent contamination as much as possible. Hence the need to control the opening of the doors by means of suitable automatic systems.

Rooms intended for the production of pharmaceutical drugs, for example, are kept at positive pressure by special conditioning systems.

Vice versa, environments in which hazardous substances, highly toxic or explosive substances, viruses or bacteria are present, are kept at negative pressure so as to prevent the inside air from coming into contact with the outside air.

When a door is opened, the established standard conditions are inevitably altered.

Hence the solution consisting of arranging suitable access filters, constituted by systems of interlocked doors.

When a door is opened, the other doors connecting the environments in the protected area cannot be opened, thereby creating actual access routes.

When a door is closed again, a locked period varying in duration is sometimes provided to enable the re-establishment of the standard pressure levels.

The control of the sequence of opening the doors and of the conditions enabling the opening thereof is normally carried out by industrial PLCs. These PLCs are complex, costly and redundant machines that are housed in electrical panels located in mechanical rooms.

Owing to the nature of these panels, they must be located in specific installation rooms that conform to current regulations and that are checked and serviced exclusively by skilled personnel.

These panels may be connected only by expert electricians and they involve the laying of large quantities of wiring.

All interventions for the addition or removal of wiring necessarily involve the intervention of skilled personnel.

Moreover, these panels require corresponding software programming, ad hoc and case by case, which must be carried out by skilled programmers. The documents US 2007/227204 A1, WO 00/77330 A1, and US 2008/284579 A1 are known that describe passive systems for detecting parameters representative of premises and the like. Such systems are not capable of receiving commands.

An object of the present invention is to provide a control apparatus for controlling access to premises that is capable of resolving the issues highlighted herein.

A specific object of the present invention is to provide a control apparatus for controlling access to premises that is easy to use even by unskilled personnel.

Another object of the present invention is to provide a control apparatus for controlling access to premises that makes it possible to parameterize the behaviours of an access door to the premises.

Another object of the present invention is to provide a control apparatus for controlling access to premises that is flexible and of universal application.

A further object of the present invention is to provide a control apparatus for controlling access to premises that enables control regardless of the position of the user.

Another object of the present invention is to provide a control apparatus for controlling access to premises that is limited in size compared to apparatuses of the prior art.

SUMMARY OF THE INVENTION

These and additional objects are achieved by the control apparatus for controlling access to premises, as described in the appended claims 1-7. The invention also describes a control system for controlling access to premises, as described in the appended claims 8-12.

The control apparatus and system for controlling access to premises, as described, achieve the following technical effects:

- They are easy to use even on the part of unskilled personnel;
- They are flexible and of universal application;
- They can be utilized regardless of the position of the user;
- They allow for the execution of a plurality of functions for access to and control of premises.

The technical effects cited and additional technical effects of the invention will appear in a more detailed form in the description, given herein below, of an embodiment provided by way of approximate, non-limiting example with reference to the accompanying drawings.

DETAILED DESCRIPTION

A control apparatus for controlling access to premises according to the invention comprises at least one access door to a premises, at least one device for detecting parameters representative of the premises and a control device associated with the premises.

Figure 1:
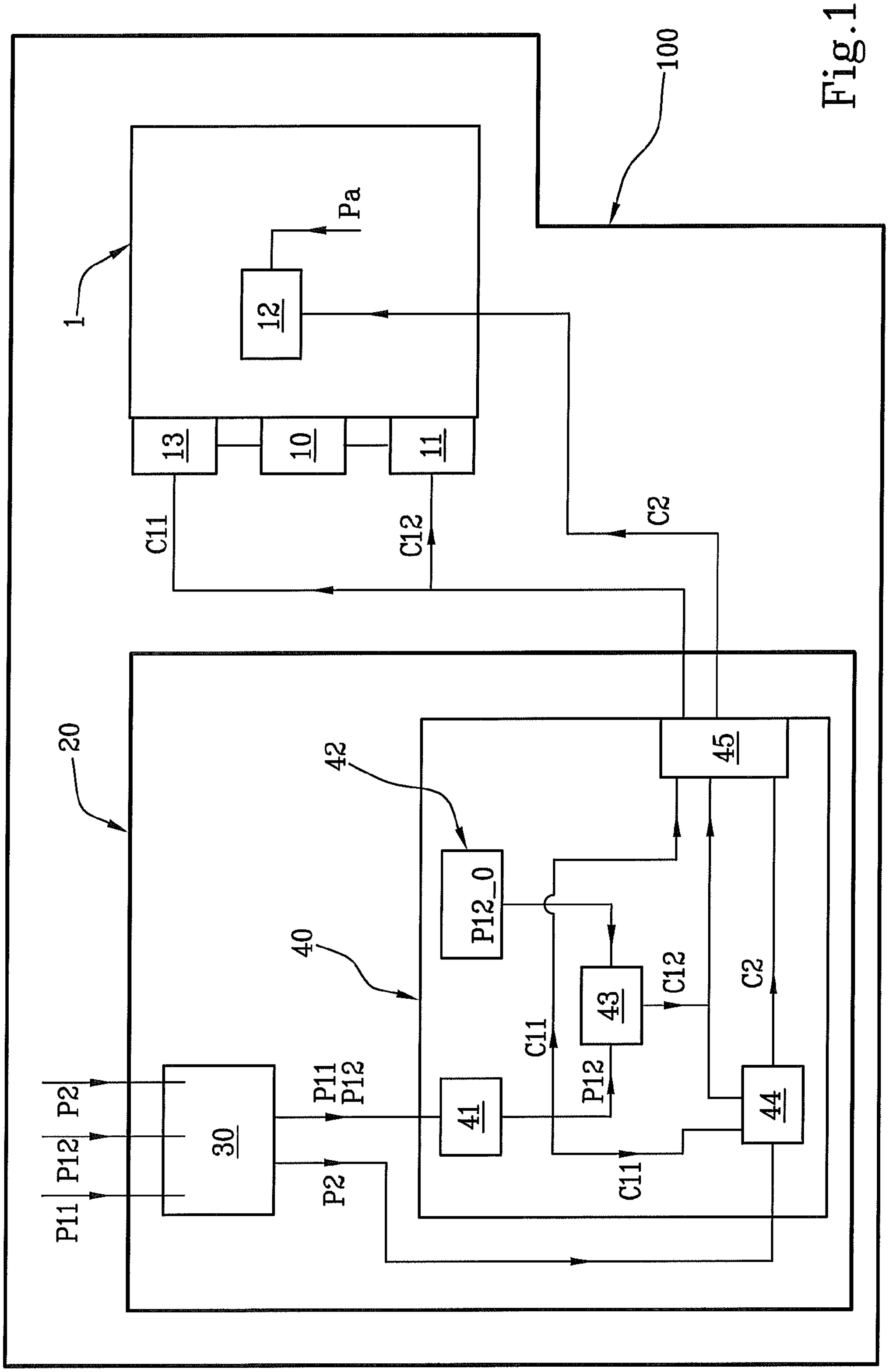
FIG. 1 is a block diagram of the apparatus of the invention.

With particular reference to FIG. 1, the control apparatus 100 for controlling access to premises comprises at least one access door 10 to a premises 1.

The apparatus 100 further comprises at least one signalling device 11 associated with at least one door 10 so as to signal the access status of the premises 1.

In other words, the signalling device 11 signals whether or not access to the premises is possible.

For the sake of brevity, reference will be made in the following to a signalling device 11 associated with a door 10.

Advantageously, according to the invention, the signalling device 11 may comprise warning lights, flashing lights, sirens, buzzers, etc. configured to signal the access status of said premises 1.

For example, the warning lights may be configured to switch on different colours, and the lights may be constant or blinking lights, with a given timing etc., so as to signal the access status of the premises.

Preferably, the apparatus 100 further comprises at least one actuating device 13, associated with the at least one door 10, and configured to execute functions on the door 10.

The actuating device 13 may comprise generic actuators, locks, particularly electric or pneumatic locks, generic automatic door activation devices, and electric motors configured to activate the door 10 or the like.

For the sake of simplicity, reference will be made in the following to an actuating device associated with a door.

According to the invention, the actuating devices 13 perform functions on the door 10 based on the status of the door as signalled by the signalling device 11.

In other words, for example if the status of the door represents a closed door, the actuating device may command an actuator, particularly a lock for actuating an unlock/open door function.

The apparatus 100 further comprises at least one detection device 12 associated with the premises 1.

In particular, the at least one detection device 12 is mounted in the premises 1.

The detection device 12 is configured to detect parameters PA representative of the premises 1.

Preferably, this detection device 12 comprises sensors of different types, for example pressure, temperature, humidity, speed, position sensors, etc., so that the parameters Pa will be representative of pressure, temperature, humidity, speed, position levels, etc.

Advantageously, according to the invention, the apparatus 100 further comprises at least one control device 20 associated with the premises 1.

In other words, the control device 20 is configured to determine the commands aimed at having the functions of the door 10 (first commands C11) and the functions of the detection devices 12 (third commands c2) be performed and receiving a status from the signalling device 11 (second commands C12).

More specifically:

- the first commands C11 comprise commands for the door 10, such as generic request commands requesting door opening, by means of locks, automatic door activation devices, electric motors, or the like.
- the second commands C12 comprise commands for the signalling device 11, such as commands for setting operative parameters, such as the colour of a warning light, the switching on of continuous or blinking light/s, the timing of the switching on of the light/s or the blinking thereof, or the like.
- the third commands C2 comprise request commands requesting data processing as a function of parameters detected by the detection devices, and commands C11 for the operation of the door 10. Advantageously, according to the invention, the control device 20 is configured to serve in controlling a premises 1 regardless of the type of door 10 utilized.

Advantageously, according to the invention, the wiring of the control device 20 is simple and reliable: the wiring related to the signalling devices 11 for management of the door (i.e., indicator lights, buzzers, door status, lock activating devices, requests to open a door, emergency requests, etc.) and of detection devices 12 such as presence sensors, fire alarms (or generic alarms), access control detectors, UV lamps, FAN, solenoid valves for activating washing and sanitization cycles, air-showers, automatic door checks, sirens, etc. is brought directly to the individual control device 20 located in the proximity of the door 10.

According to the invention, the control device 20 comprises an interface 30 configured to receive configuration parameters for the functions of the door 10 (first commands C11), for the functions of the detection devices 12 (third commands C2) and for the functions of the signalling device 11 (second commands C12).

In one embodiment of the invention, the interface 30 is configured so as to enable communication between a Building Management System (or BMS) and the control device 20.

In a preferred embodiment of the invention, the interface 30 is configured so as to enable communication between a user and the control device 20. Advantageously, according to the invention, in the preferred embodiment of the invention, the user interface 30 is a graphical user interface that manages the configuration parameters in a simplified mode.

The technical effect achieved consists in the simplicity of the configuration of the parameters even by an unskilled user, as determined by the immediacy of the graphical message.

According to the invention, the user interface 30 is configured to receive first primary parameters P11 representative of first commands C11 for the door 10.

The first primary parameters P11 are thus parameters representative of the first commands C11, which comprise one or more generic request commands requesting door opening, by means of locks, automatic door activation devices, electric motors, or the like.

The first primary parameters P11, according to the invention, define the described behaviours.

In other words, for access to the premises 1, the invention makes it possible to parameterize the behaviours of the access door 10 in such a manner that an unskilled user can change them according to the requirements of the premises.

The first commands C11 are executed by the actuating devices 13. According to the invention, the actuating devices 13 perform functions on the door 10 based on the status of the door, as signalled by the signalling device 11.

The user interface 30 is also configured to receive second primary parameters P12 representative of second commands C12 for the signalling devices 11.

The second primary parameters P12 are thus parameters representative of the second commands C12, which comprise one or more commands for setting operative parameters, such as the colour of a warning light, the switching on of continuous or blinking light/s, the timing of the switching on of the light/s or the blinking thereof, etc.

For example, a user may desire that when the door opens, the green warning light will flash, the buzzer will sound and the lock will remain released for 4 seconds if no one enters.

The auxiliary parameters P2 are parameters representative of requests for data processing as a function of the parameters Pa detected by the detection devices 12 and the first commands C11 controlling the operation of the door 10.

Advantageously, according to the invention, the control device 20 is configured to operate in controlling a premises 1 regardless of the type of door 10 utilized.

Advantageously, according to the invention, the apparatus proves to be very flexible based on the behaviours requested by the user and explicitly indicated by means of the selection of parameters P11, P12 and P2. Moreover, configuration is normalized and as such, it is certifiable and of universal application.

In apparatuses of the prior art, configuration, which is implemented by means of programming a PLC, requires validation each time changes are made, as each change in the program alters the structure thereof.

On the contrary, the apparatus of the invention provides configurations of predefined parameters that determine changes in the processing of the data without altering any structure of the apparatus, be it hardware or software. As a result, changes in the configurations do not require that re-validation of the application.

Advantageously, according to the invention, the control device 20 comprises a processing unit 40 for processing the input parameters of the control device 20.

In general, it should be noted that in this context and in the claims that follow, the processing unit 40 shall be presented as being subdivided into distinct functional modules (memory modules or operating modules) solely for the purpose of describing the functions of this unit clearly and thoroughly.

This unit may actually be constituted by a single electronic device, suitably programmed to carry out the functions described, and the various modules may correspond to hardware units and/or to routine software that are part of the programmed device.

Alternatively or additionally, these functions can be carried out by a plurality of electronic devices on which the above-mentioned functional modules can be distributed.

The processing unit may also make use of one or more processors for execution of the instructions contained in the memory modules.

In addition, the above-mentioned functional modules may be distributed on different local or remote network computers based on the architecture of the network in which they reside.

The processing unit 40 comprises a first operating module 41 configured to receive as input the first primary parameters P11 and the second primary parameters P12.

The first operating module 41 is further configured to determine the first commands C11 for the door 10 as a function of the first primary parameters P11 and the second primary parameters P12.

The processing unit 40 further comprises a first memory module 42 comprising predefined values P12_0 of the second primary parameters P12.

The processing unit 40 further comprises a comparison module 43 configured to compare the values of the second primary parameters P12 with the predefined values P12_0 and to determine second commands C12 for the signalling device 11.

In other words, in order to determine the second commands C12 for the signalling device 11, the apparatus of the invention comprises that the parameter P12 representative of the command is compared with the current value P12_0 and following this comparison, the corresponding second command C12 is defined.

For example, if the flashing green colour is set to indicate the possibility of access to the premises 1, the parameter P12_0 shall be representative of this status; if the parameter P12 requires the setting of a constant green colour to indicate the possibility of access to the premises 1, the comparison module 43 will take care of determining the corresponding second command C12 for changing the status.

The processing unit 40 comprises a second operating module 44 configured to receive as input the auxiliary parameters P2.

The second operating module 44 is configured to determine third commands C2 for said at least one detection device 12 as a function of the auxiliary parameters P2 and of one or more among the first commands C11 and the second commands C12.

The third commands C2 are representative of a programming of events managed by the control device 20.

For example, the third command C2 for detection of a temperature within the premises 1 takes place as a function of a corresponding sent parameter P2 representative of a request and of the closed status C11 of the door.

In other words, the auxiliary parameters P2 define the behaviour of the door 10 as a function of the door status commands C11.

For example, if the door is in a state of emergency, a third command C2 representative of an emergency is issued until the state of emergency is over.

The emergency command can be timed in such a manner that it stops at a given interval of time following cessation of the state of emergency or immediately upon cessation of the state of emergency.

The processing unit 40 comprises a third operating module 45 configured to transmit the first and second commands C11, C12 to the door 10 and the third commands C2 to the detection device 12.

Figures 2, 2A:
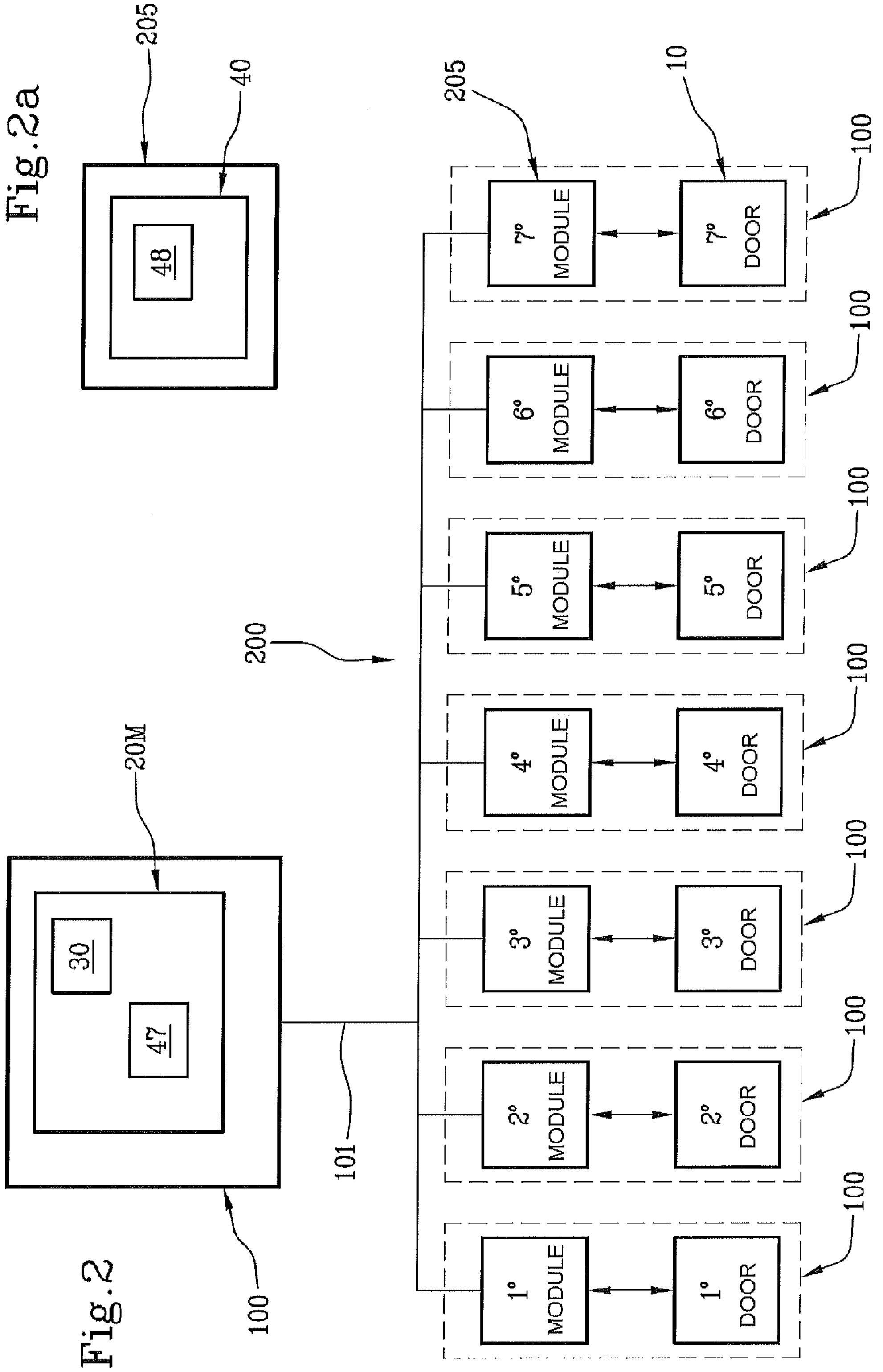
FIG. 2 is a block diagram of the system of the invention as realized with distributed logic, connecting more than one control device/module to each other.
FIG. 2*a* shows a detail of FIG. 2.

With reference to FIG. 2, the invention further comprises a system for management of access to controlled premises comprising a plurality of apparatuses 100.

In concrete terms, the invention comprises a network of apparatuses set up in a local or remote network and in continuous communication.

The system comprises connecting devices 101 configured to connect the apparatuses 100.

The connection may take place by means of a standard industrial bus MODBUS, or by means of an Internet network.

The connection can be realized in a local network and/or a wide-area network.

The guaranteed technical effect consists in the possibility of sending commands for managing the premises 1 regardless of the actual position of the operator.

According to the invention, one of the apparatuses 100 comprises a first control device 20M (FIG. 2) configured as a master device.

This configuration is preferably carried out physically, at the level of the hardware, by setting a jumper on the control device 20M.

As described in the part concerning the apparatus 100, the control device 20M comprises a user interface 30, particularly a graphical interface for setting the configurations of the master control device 20M.

According to the invention, the remaining apparatuses 100 comprise the respective second control devices 20S configured as slave devices controlled by the above-mentioned master device 20M; each control device 20S is equipped with its own user interface 30.

According to the invention, the slave devices 20S can be programmed to operate in an off-line mode, independently of the presence of the master device.

The slave devices 20S are configured to be programmed by means of the respective user interfaces 30 and prior to connection to the master device 20M.

Following connection to the master device 20M, the latter, by means of the interface 30 and a management module 47, enables the management of door interlock and waiting rules for the slave devices 20S, so that the latter can operate without a master device, if the master device 20M fails for any reason.

In particular, the master device 20M manages the following interactions on the slave devices, once they have been connected:

definition of the rules of the interlocking of the doors connected to the slave devices 20S, that is, in the case in which a given door is open, the rules defining how the other doors should behave;

definition of the interval of time provided between the opening of a given door and the return to the initial state, for each door connected to the slave devices 20S; in particular, the time interval may vary depending on whether the door has been opened in one path direction or another (from the inside out, or from the outside in, with respect to the controlled premises).

In this situation, the slave devices 20S constitute a subnetwork 200 (FIG. 2) independent of the master device 20M.

The technical effect achieved consists in the reliability of the networks and, as a result, the certainty of the control of the premises 1, even in the event of failure of the master device 20M.

A control device 20S is connected to the master device 20M by means of a serial port, for example an RS485 serial port, to which a fieldbus is connected, with a resulting lower cost of the wiring, that is, less consumption of materials, lower cost of laying the wiring, that is, lower installation costs, and lower maintenance costs.

The use of a fieldbus on the RS485 also makes the system more reliable as concerns the sending of numerous analogue and digital signals to the master device 20M, and it permits a greater distance (up to 1200 m) between the master device and the individual slave device 20S.

Additionally, according to the invention, each processing unit 40 comprises an off-line setting module 48 configured to receive instructions from the management module 47 of the master control device 20S for possible off-line operation.

In this manner, even if an apparatus 100, configured as a master apparatus, disconnects from the network, the system is capable of reacting, ensuring operating continuity.

The technical effect obtained consists in high reliability and fault tolerance. Further advantages are ensured by the fact that the apparatus and the system of the invention manage access to premises provided with any type of door, for example double doors, sliding doors, doors with automatic devices, inflatable seal doors, etc.

Furthermore, by means of the user interface 30, the control devices can be configured by the user with maximum flexibility using a graphics software program.

Owing to the special connection with a fieldbus, the devices permit rapid, error-proof connections.

Owing to the simplicity of the interface, configuration of the device does not require expert skilled technicians to be set up, unlike prior-art systems realized with PLCs.

Furthermore, the control devices are limited in size and can be inserted in the section of the doorframe.

The door can be tested and certified on-site at the plant, offering considerable advantages in terms of security, time savings and quality.

The invention claimed is:

1. A control apparatus for controlling access to premises comprising:

at least one access door for access to a premises;

at least one signalling device associated with said at least one door and configured to signal an access status of the premises;

at least one detection device associated with said premises and configured to detect parameters (Pa) representative of said premises;

a control device associated with said premises wherein said device comprises a user interface and a processing unit; wherein said user interface is configured to receive:

first primary parameters representative of first commands for said at least one door;

second primary parameters representative of second commands for said signalling devices;

auxiliary parameters representative of third commands for said at least one detection device;

and said processing unit for processing the input parameters of said control device comprises:

a first operating module configured to:

receive as input said first primary parameters and second primary parameters;

determine said first commands for said door as a function of said first primary parameters and said second primary parameters;

a second operating module configured to:

receive as input said auxiliary parameters;

determine said third commands for said at least one detection device as a function of said auxiliary parameters and of one or more among said first commands and said second commands;

a third operating module configured to transmit said first and third commands to said at least one door and to said at least one detection device, respectively.

2. The apparatus according to claim 1, comprising at least one actuating device, associated with the at least one door, and configured to execute said first commands on said door.

3. The apparatus according to claim 2, wherein said auxiliary parameters comprise request commands requesting data processing as a function of parameters detected by the detection devices and of one or more among said first commands and said second commands.

4. The apparatus according to claim 2, wherein said processing unit further comprises:

a first memory module comprising predefined values of said second primary parameters;

a comparison module configured to compare the values of said second primary parameters with said predefined values and to determine third commands for said at least one signalling device;

said third operating module being configured to transmit said third commands to said at least one signalling device.

5. The apparatus according to claim 4, wherein said second primary parameters are representative of said second commands for said at least a signalling device, said second commands comprising one or more among commands for setting operative parameters, such as the colour of a warning light, the switching on of continuous or blinking light/s, the timing of the switching on of the light/s or of the blinking thereof, or the like.

6. The apparatus according to claim 4, wherein said auxiliary parameters comprise request commands requesting data processing as a function of parameters detected by the detection devices and of one or more among said first commands and said second commands.

7. The apparatus according to claim 1, wherein said processing unit further comprises:

a first memory module comprising predefined values of said second primary parameters;

a comparison module configured to compare the values of said second primary parameters with said predefined values and to determine third commands for said at least one signalling device;

said third operating module being configured to transmit said third commands to said at least one signalling device.

8. The apparatus according to claim 7, wherein said second primary parameters are representative of said second commands for said at least a signalling device, said second commands comprising one or more among commands for setting operative parameters, such as the colour of a warning light, the switching on of continuous or blinking light/s, the timing of the switching on of the light/s or of the blinking thereof, or the like.

9. The apparatus according to claim 7, wherein said auxiliary parameters comprise request commands requesting data processing as a function of parameters detected by the detection devices and of one or more among said first commands and said second commands.

10. The apparatus according to claim 1, wherein said signalling devices comprise one or more among warning lights, flashing lights, sirens and buzzers configured to signal an access status of said premises.

11. The apparatus according to claim 1, wherein said first primary parameters are representative of said first commands for said door, said commands comprising one or more among generic request commands requesting door opening by means of locks, automatic door activation devices, electric motors, or the like.

12. The apparatus according to claims 1, wherein said second primary parameters are representative of said second commands for said at least a signalling device, said second commands comprising one or more among commands for setting operative parameters, such as the colour of a warning light, the switching on of continuous or blinking light/s, the timing of the switching on of the light/s or of the blinking thereof, or the like.

13. The apparatus according to claim 1, wherein said auxiliary parameters comprise request commands requesting data processing as a function of parameters detected by the detection devices and of one or more among said first commands and said second commands.

14. A system for management of access to controlled premises, comprising:

a plurality of apparatuses, according to claim 1;

connecting devices configured to connect said apparatuses.

15. The system according to claim 14, wherein said slave devices are configured to be programmed by means of the respective user interfaces and prior to connection to said master device.

16. The system according to claim 15, wherein every said second control device, configured as a slave connected to said master device, comprises said processing unit, which, in turn, comprises an off-line setting module configured to receive instructions from said management module of said master control device for operating without said master device.

17. The system according to claim 14, wherein:

one of said apparatuses comprises a first control device configured as a master device;

the remaining apparatuses comprise respective second control devices configured as slave devices controlled by said master device.

18. The system according to claim 17, wherein every said second control device, configured as a slave connected to said master device, comprises said processing unit, which, in turn, comprises an off-line setting module configured to receive instructions from said management module of said master control device for operating without said master device.

19. The system according to claim 17, wherein said first control device configured as a master, comprises a processing unit, which, in turn, comprises a management module, configured to manage door interlock and waiting rules for said slave devices, so that they can work without said master device, if said master device fails.

20. The system according to claim 19, wherein every said second control device, configured as a slave connected to said master device, comprises said processing unit, which, in turn, comprises an off-line setting module configured to receive instructions from said management module of said master control device for operating without said master device.

21. The system according to claim 17, wherein said slave devices are configured to be programmed by means of the respective user interfaces and prior to connection to said master device.

22. The system according to claim 21, wherein every said second control device, configured as a slave connected to said master device, comprises said processing unit, which, in turn, comprises an off-line setting module configured to receive instructions from said management module of said master control device for operating without said master device.

* * * * *